US012589976B2

(12) United States Patent
Baas et al.

(10) Patent No.: US 12,589,976 B2
(45) Date of Patent: Mar. 31, 2026

(54) LIFTING SYSTEM

(71) Applicant: ZAMQUA HOLDING B.V., Lisse (NL)

(72) Inventors: Fred Baas, Lisse (NL); Jan Pieter Maarschalk, Lisse (NL)

(73) Assignee: ZAMQUA HOLDING B.V., Lisse (NL)

( * ) Notice: Subject to any disclaimer, the term of this patent is extended or adjusted under 35 U.S.C. 154(b) by 326 days.

(21) Appl. No.: 18/267,871

(22) PCT Filed: Nov. 22, 2021

(86) PCT No.: PCT/IB2021/060813

§ 371 (c)(1),
(2) Date: Jun. 16, 2023

(87) PCT Pub. No.: WO2022/130069

PCT Pub. Date: Jun. 23, 2022

(65) Prior Publication Data

US 2024/0051804 A1 Feb. 15, 2024

(30) Foreign Application Priority Data

Dec. 18, 2020 (NL) ..................................... 2027161

(51) Int. Cl.
*B66F 3/35* (2006.01)

(52) U.S. Cl.
CPC ..................................... *B66F 3/35* (2013.01)

(58) Field of Classification Search
CPC ...... B66F 3/00; B66F 3/24; B66F 3/40; B66F 3/35
See application file for complete search history.

(56) References Cited

U.S. PATENT DOCUMENTS

| | | | | |
|---|---|---|---|---|
| 4,688,760 A * | 8/1987 | Garman | A47C 3/38 254/122 |
| 6,082,708 A * | 7/2000 | Mullican | B66F 3/35 254/93 HP |
| 6,929,249 B1 * | 8/2005 | Kim | B66F 3/35 254/93 H |
| 2012/0248393 A1 * | 10/2012 | Moore | B66F 3/35 254/93 HP |

(Continued)

FOREIGN PATENT DOCUMENTS

| | | |
|---|---|---|
| CN | 202729692 U | 2/2013 |
| CN | 203048493 U | 7/2013 |

(Continued)

*Primary Examiner* — Lee D Wilson
(74) *Attorney, Agent, or Firm* — Perry + Currier Inc.

(57) ABSTRACT

A lifting system comprises a platform (10) with at least one inflatable body (21, 22) which is connected to a fluid conduit (23, 24) for the purpose of receiving an inflating fluid, particularly a gas under increased pressure such as compressed air. In a first aspect the at least one inflatable body (21, 22) is connected for rotation about a rotation axis (H) relative to the platform (10). The inflatable body (21, 22) bounds here a winding space (40) in which the fluid conduit, when not in use, is received in a state in which it is wound around the rotation axis. In a second aspect the lifting system comprises on or at the platform (10) a fluid system (51, 52) which is remotely controllable.

10 Claims, 7 Drawing Sheets

(56) References Cited

U.S. PATENT DOCUMENTS

| | | | | |
|---|---|---|---|---|
| 2016/0051426 | A1* | 2/2016 | Hall | A47C 7/002<br>254/93 HP |
| 2016/0355385 | A1* | 12/2016 | Nielsen | B66F 3/35 |
| 2018/0273360 | A1* | 9/2018 | Nasrin | B66F 3/35 |
| 2019/0210848 | A1* | 7/2019 | Coccaro | B66F 5/04 |
| 2020/0325008 | A1* | 10/2020 | Wakabayashi | B66F 3/247 |
| 2021/0196054 | A1* | 7/2021 | Gabbay | B66F 3/35 |
| 2024/0051804 | A1* | 2/2024 | Baas | B66F 3/35 |

FOREIGN PATENT DOCUMENTS

| | | | |
|---|---|---|---|
| GB | 2286430 | A | 8/1995 |
| WO | WO-2017133583 | A1 | 8/2017 |

* cited by examiner

LIFTING SYSTEM

The present invention relates to a lifting system, comprising a platform with at least one inflatable body which is connected to a fluid conduit for the purpose of receiving an inflating fluid, particularly a gas under increased pressure such as compressed air.

The invention relates here particularly to such a lifting system which can be utilized to lift and then support a wreck or the like in the event of calamities and accidents. The platform can here be placed with the inflatable body between a ground surface and the object to be lifted, and then be inflated in situ. The inflatable body now rises up and with this lifts the object resting thereon. This creates space underneath the object so that a victim trapped thereunder can for instance be freed.

It is of great importance that a rescue worker is able to safely work as quickly as possible here. Most critical here are the placing and assembly of the lifting system at a moment that the assembly with the object to be lifted may still be unstable and the rescue worker is forced to approach the object in order to place the lifting system. The known lifting system moreover comprises here a large number of separate components, such as air hoses, a compressed air cylinder, a pressure controller and a control unit, that still have to be coupled to each other, this entailing loss of valuable time.

The present invention has for its object, among others, to provide a lifting system which can be implemented in relatively rapid and simple manner for lifting an object in the event of calamities and accidents, wherein the placing danger for a rescue worker is moreover limited.

In order to achieve the intended object a lifting system of the type described in the preamble has the feature in a first aspect according to the invention that the at least one inflatable body is connected for rotation about a rotation axis relative to the platform and bounds a winding space in which the fluid conduit, when not in use, is received in a state in which it is wound around the rotation axis. The invention is here based on the insight that the rescue worker runs a substantial risk in practice if the lifting system has not yet fully risen, and the object to be lifted may therefore still be unstable or metastable, while the inflatable body must be coupled via the fluid conduit to an external fluid system.

According to the invention, the relevant inflatable body now functions as part of a reel which enables the fluid conduit coupled to the inflatable body beforehand to be unwound in simple and smooth manner and in a short amount of time, while the remaining part of the lifting system remains in position. The rescue worker here remains at a distance in a safe(r) zone as much as possible and as soon as possible. The winding space, when not in use, furthermore provides space for the fluid conduit, whereby the whole stays together and can be stored in particularly compact and practical manner.

In a particular embodiment the lifting system according to the invention is characterized in that the at least one inflatable body comprises an inflatable cushion which is connected rigidly to a central shaft, and that the central shaft extends from the platform rotatably about a central axis of the at least one inflatable body. Such a lifting cushion can for instance be manufactured in a manner as described in Netherlands patent NL 2013075. Such a lifting cushion can take a seamless form by wrapping fibres around a mould, wherein the fibres are incorporated in a casing of an elastomeric plastic. With a view to a high loadability (tensile strength) in combination with flexibility of the cushion use is here advantageously made of a wrapping of carbon fibres in an optionally natural rubber as plastic.

In a preferred embodiment the lifting system according to the invention has the feature that the at least one inflatable body comprises a stack of a first inflatable body and a second inflatable body, and that the first inflatable body and the second inflatable body bound the winding space therebetween and are both connected for rotation about the rotation axis relative to the platform. The two inflatable bodies thus together form a reel which the fluid conduit can be wound onto and unwound from. This reel is here rotatable relative to the platform so that this can remain stationary.

In order to achieve the intended object a lifting system of the type described in the preamble has the feature in a second aspect of the invention that the fluid conduit connects the inflatable body to a fluid reservoir via electronically controllable valve means, that the valve means are coupled to an electronic control device and are controllable thereby, and that an operating device is coupled to the control device in order to enable a user to operate the control unit. The fluid reservoir is thus accommodated in the lifting system and is connected to the inflatable body via the fluid conduit and the controllable valve means.

Once the lifting system has been positioned underneath the object or part of the object to be supported, a rescue worker can operate this system wholly remotely. The operating unit can here be coupled to the control device in wired manner. A particular embodiment of the lifting system however has the feature that the operating device is coupled wirelessly to the control device.

The whole can take a particularly compact and integrated form. For this purpose a preferred embodiment of the lifting system according to the invention has the feature that the fluid reservoir, the valve means and the control device are connected optionally directly to the platform together with the at least one inflatable body. All vital parts of the lifting system, with the exception of the operating unit, are thus situated on or at the platform.

The valve means can comprise a control valve which can be controlled electronically and here switches between a closed and an at least substantially completely open position. A gradual, stepwise deployment of the inflatable body can here nevertheless be achieved by means of an intermittent control signal. The valve means can however also comprise a proportionally controllable pressure reducing valve whereby the inflatable body can be filled more quickly or more gradually in controlled manner, optionally in steps. Depending on the occurring emergency, a rescue worker can select an optimal deployment regime with the operating device and thus raise or lower the lifting system as desired.

In a further preferred embodiment the lifting system according to the invention has the feature that the platform comprises a rolling and/or sliding undercarriage. Such an undercarriage enhances a safe positioning of the lifting system which can thus be respectively rolled or slid underneath the object to be lifted. In order to be able to perform this remotely a further preferred embodiment of the lifting system here has the feature according to the invention that the platform is coupled to a shaft, wherein the shaft provides a handle at a proximal outer end. The shaft provides here for placing of the platform while the rescue worker can remain removed from the object by a minimum of one shaft length. The shaft subsequently no longer has any function.

In order to avoid the shaft from eventually forming an obstacle a further embodiment of the lifting system according to the invention has the feature that the shaft is coupled to the platform in manually releasable manner. Once the lifting system has been brought into position using the shaft, the shaft can in that case be uncoupled and removed in simple manner.

A preferred embodiment of the lifting system here has the feature according to the invention that the shaft features a control device and/or operating device for a fluid reservoir as well as the fluid reservoir and that said fluid conduit is connected to the fluid reservoir. At least substantially the whole inflating means for inflating the inflating bodies is thus also co-displaced at the same time as the shaft, after which they are immediately ready for use. This saves valuable time, which might otherwise be needed for mutually coupling the individual components of the inflating means.

Ideally, every rescue vehicle has a lifting system according to the invention on board, in addition to numerous other tools and emergency supplies. In order to take up as little space as possible here a preferred embodiment of the lifting system according to the invention has the feature that the shaft is coupled to the platform for pivoting about a pivot axis and can be folded together with the platform with the at least one inflatable body.

The invention will now be further elucidated on the basis of several exemplary embodiments and an accompanying drawing. In the drawing.

It is otherwise noted here that the figures are purely schematic and not all drawn to (the same) scale. Some dimensions in particular may be exaggerated to greater or lesser extent for the sake of clarity. Corresponding parts are designated in the figures with the same reference numeral.

Figure 1:
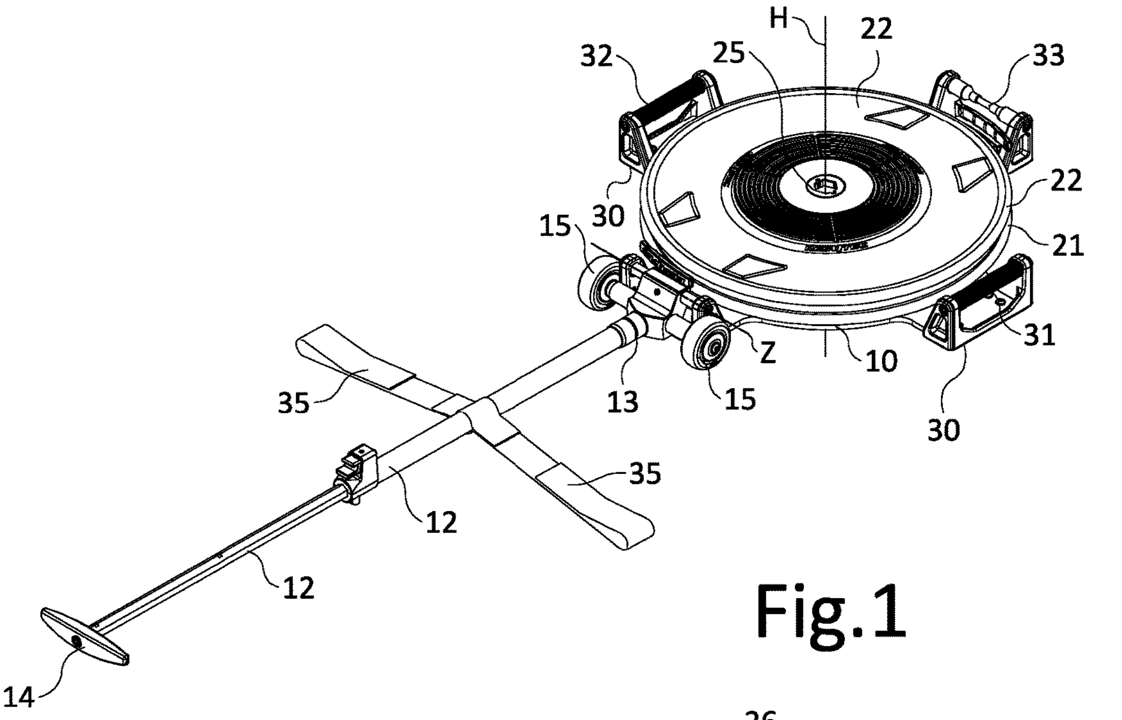
FIG. 1 shows a perspective view of a first exemplary embodiment of the lifting system according to the first aspect of the invention in an unfolded state.
Figure 3:
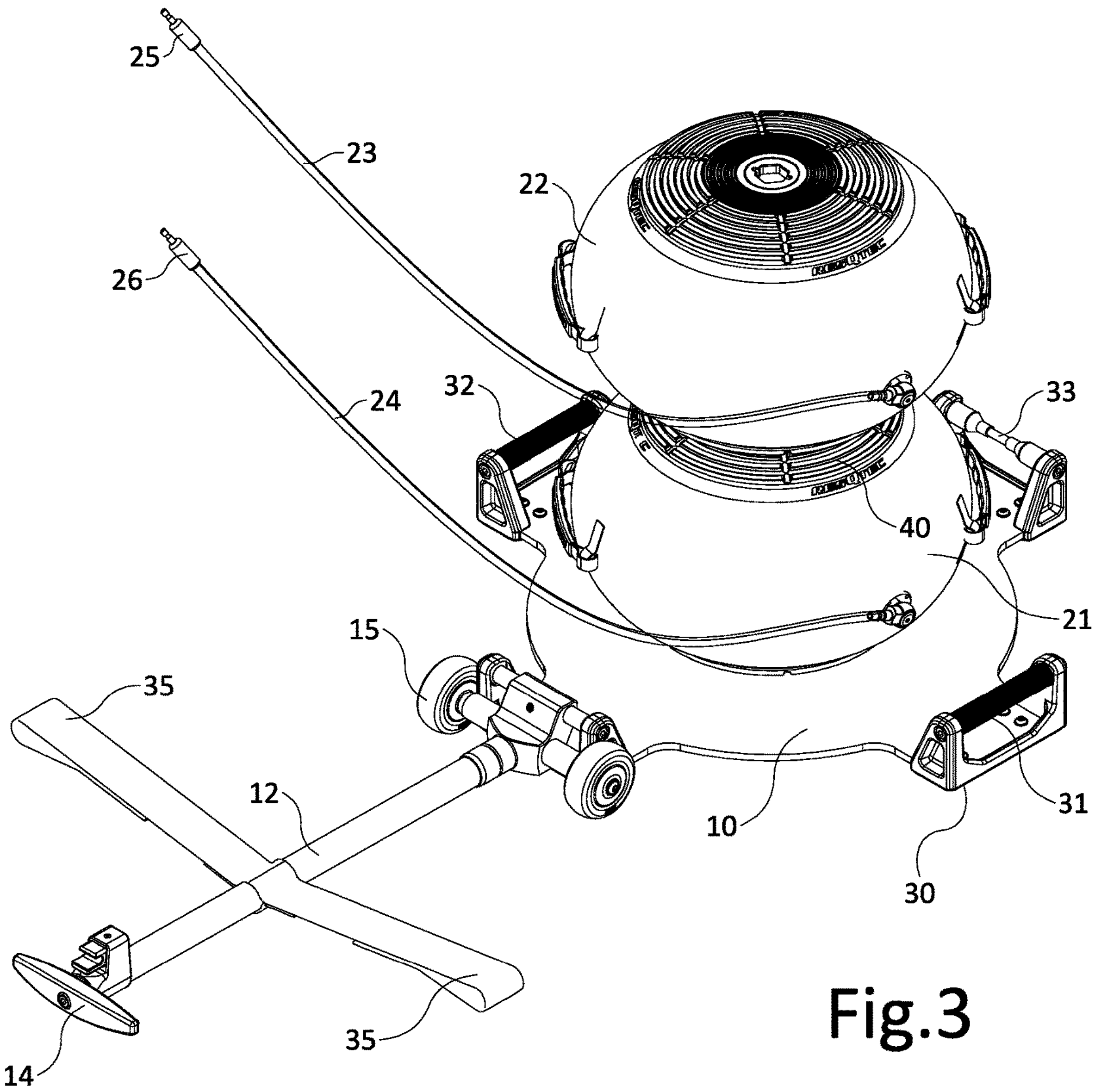
FIG. 3 shows a perspective view of the lifting system of FIG. 1 in an inflated state.

FIG. 1 shows an example of a lifting system according to a first aspect of the invention. The lifting system essentially comprises a platform 10 with a stack of two inflatable bodies 21, 22 thereon. Bodies 21, 22 are placed one on the other and are coupled to platform 10 for rotation about a central axis H by means of a steel core body 25, see also FIG. 3 and FIG. 4. Extending radially from the platform is a number of handles 31-33 whereby the whole can be handled and positioned in the vicinity of the object to be lifted in practical manner. On an underside the handles 31-33 each comprise a flat bottom 30 which serves, among other things, as resistance-reducing sliding surface when the system is being slid underneath an object to be lifted.

The inflatable bodies 21, 22 placed on the platform each comprise an inflatable cushion with a (carbon) fibre-reinforced elastomeric outer wall, as described in the above-stated Netherlands patent NL 2013075. The cushions 21, 22 of this example are formed from a synthetic rubber such as EPDM, wherein a reinforcement of wrapped aramid fibres is applied therein. If desired, it is also possible to resort to otherwise embodied inflatable bodies, and more or fewer inflatable bodies can be applied, provided that they are able to support a required loadability. Cushions 21, 22 are connected rigidly to the steel core body 25, which core body 25 is in turn bearing-mounted in platform 10 by means of a suitable ball bearing or slide bearing 11 so that the core can thus be rotated smoothly therein together with the cushions 21, 22 mounted thereon.

A telescopically extendable shaft 12 is coupled releasably to platform 10 by means of a bayonet 13, or otherwise, and provides a handle 14 at a proximal outer end. At a position where shaft 12 is connected to platform 10, the platform comprises a wheel assembly 15. This wheel assembly 15 supports in rolling manner on a ground surface beyond a smooth, disc-like underside 16 of platform 10 so that the device can be easily carried along by the hand by a rescue worker. At the intended location the wheels 15 are folded in and, using shaft 12, the rescue worker slides platform 10 with cushions 21, 22 thereon under the object to be lifted from a safe distance, making use of the flat underside 16 and the flat bottoms 30 of handles 31-33, which reduce a sliding resistance.

Figure 4:
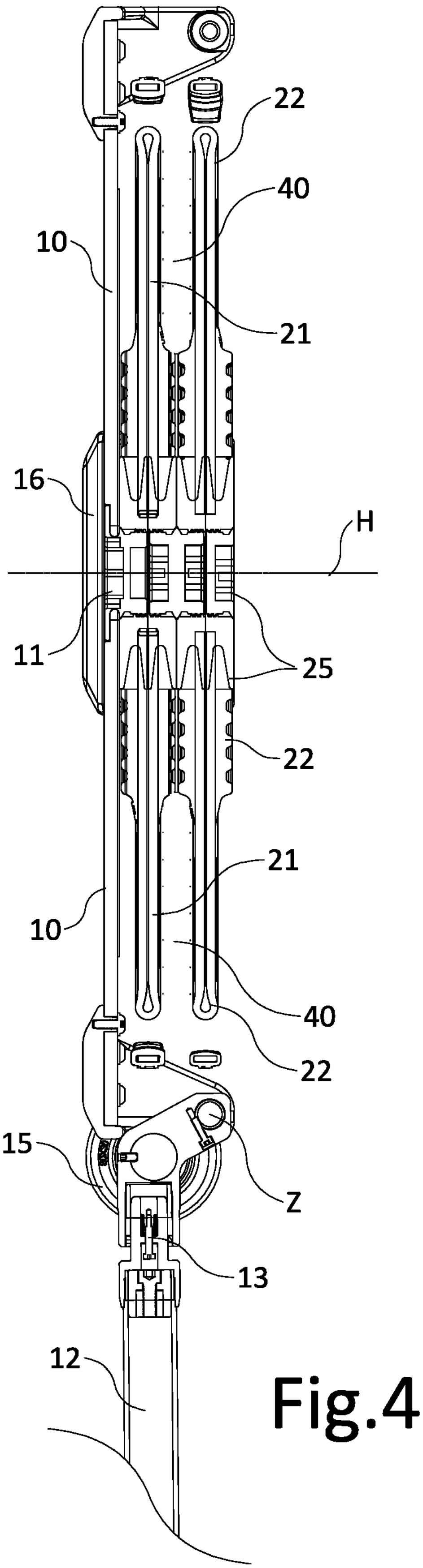
FIG. 4 shows a cross-section of the lifting system of FIG. 1 in the unfolded state.
Figure 5:
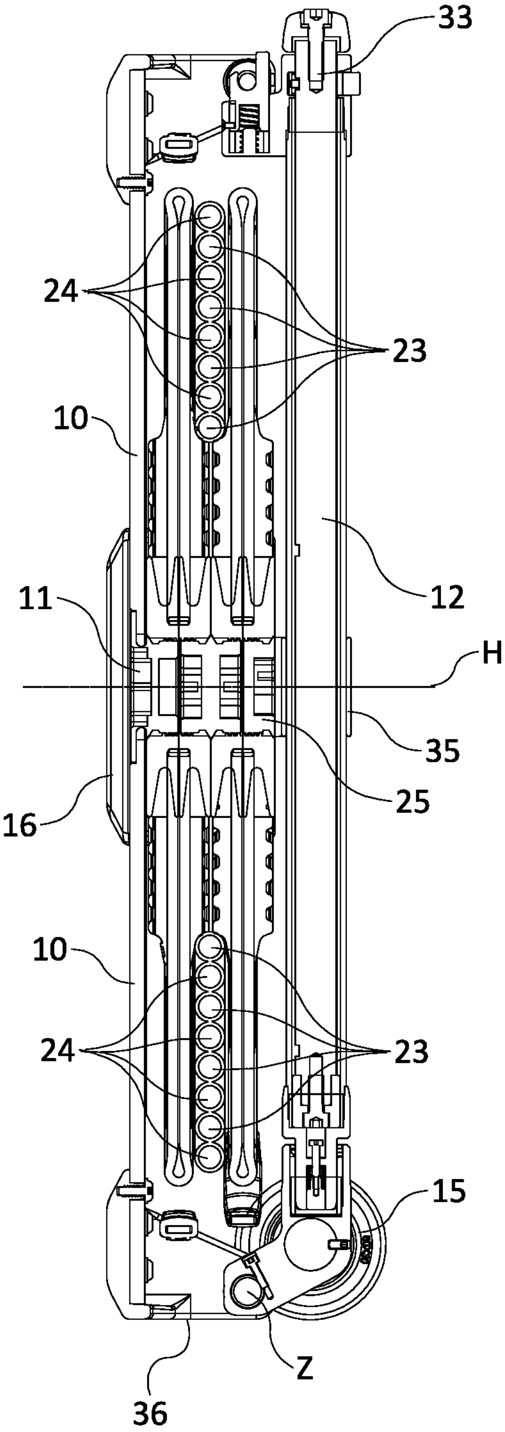
FIG. 5 shows a cross-section of the lifting system of FIG. 1 in a folded-up storage and/or transport state.
Figure 6:
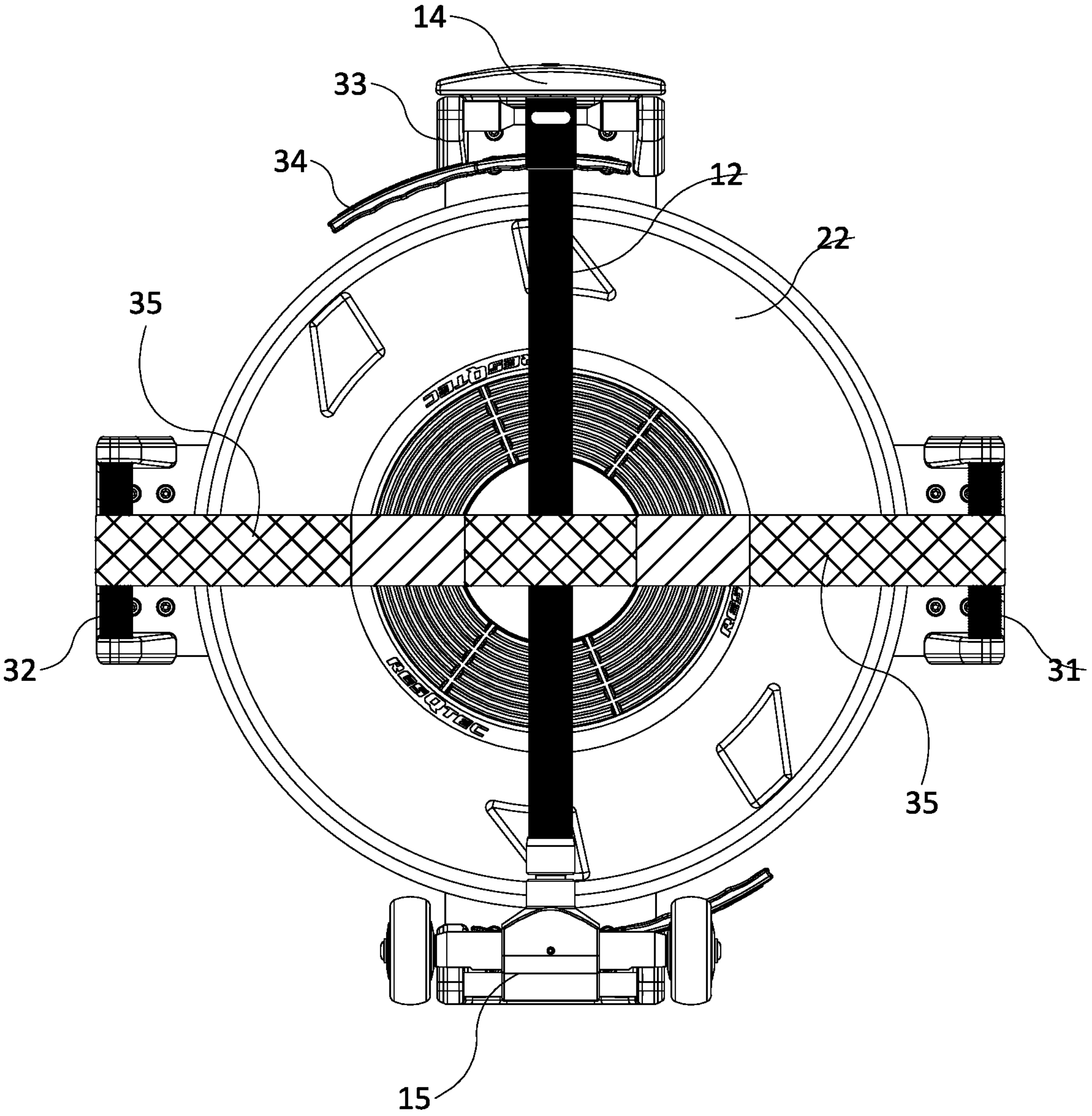
FIG. 6 shows a top view of the lifting system of FIG. 4 in the folded-up storage and/or transport state.

Shaft 12 is connected together with wheel assembly 15 to the platform for pivoting about a pivot axis Z, so that the shaft can be retracted and folded up into a compact whole with lifting system 10, 21, 22 when not in use, as shown in FIG. 4 and FIG. 5. A strap 35 keeps the whole together in this position, wherein the handle 14 of the shaft is furthermore closed into a handle 33 of platform 10 and can be secured therein by means of a lock 34. The flat bottom 36 of the whole provides for stability when the system is placed vertically.

Once in position, the two bodies 21, 22 with a compressed air system (not shown) provided for this purpose can be inflated. For this purpose each of the cushions can be connected to the compressed air system by means of a separate inflation conduit 23, 24.

Figure 2:
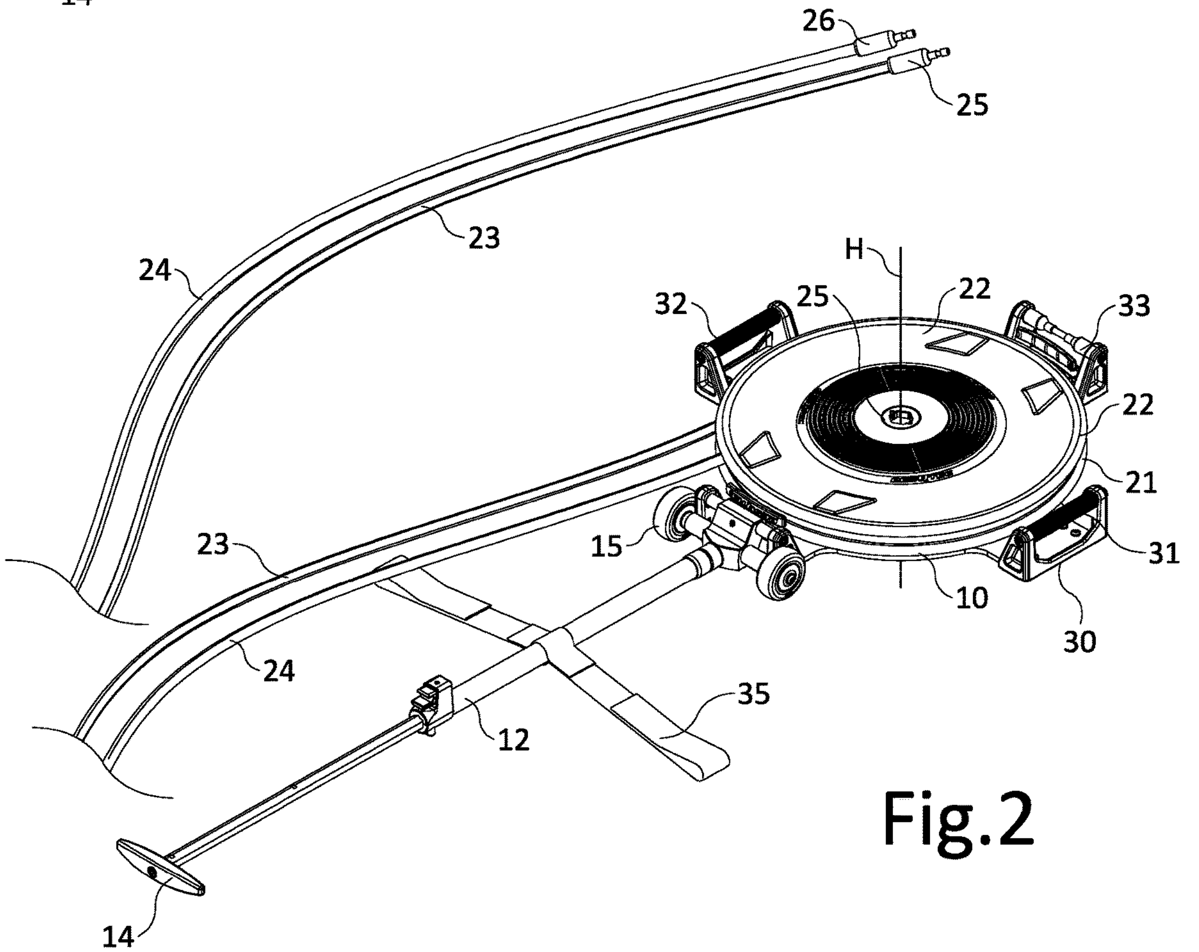
FIG. 2 shows a perspective view of the lifting system of FIG. 1 in a ready-to-use state.

The compressed air system comprises for instance a compressed air cylinder with a controller which enables the rescue worker to regulate and control the supply of compressed air to the cushion in question. According to the invention, the conduits 23, 24 are connected beforehand to the inlet of the relevant cushion 21, 22, and in the situation shown in FIG. 1 the conduits lie rolled up in a winding space 40 which is bounded by the two cushions 21, 22. Because cushions 21, 22 are suspended with core body 25 rotatably about the central axis H, they thus form a hose reel from which the two conduits 23, 24 can be unrolled with only a small amount of effort, see FIG. 2. Conduits 23, 24 can for this purpose be gripped at their free outer ends 25, 26 and be pulled by the rescue worker toward the rescue worker to a safe distance from the object to be lifted. The outer ends are there coupled to the compressed air system, and the system is ready to be deployed into the situation shown in FIG. 3.

Figure 7:
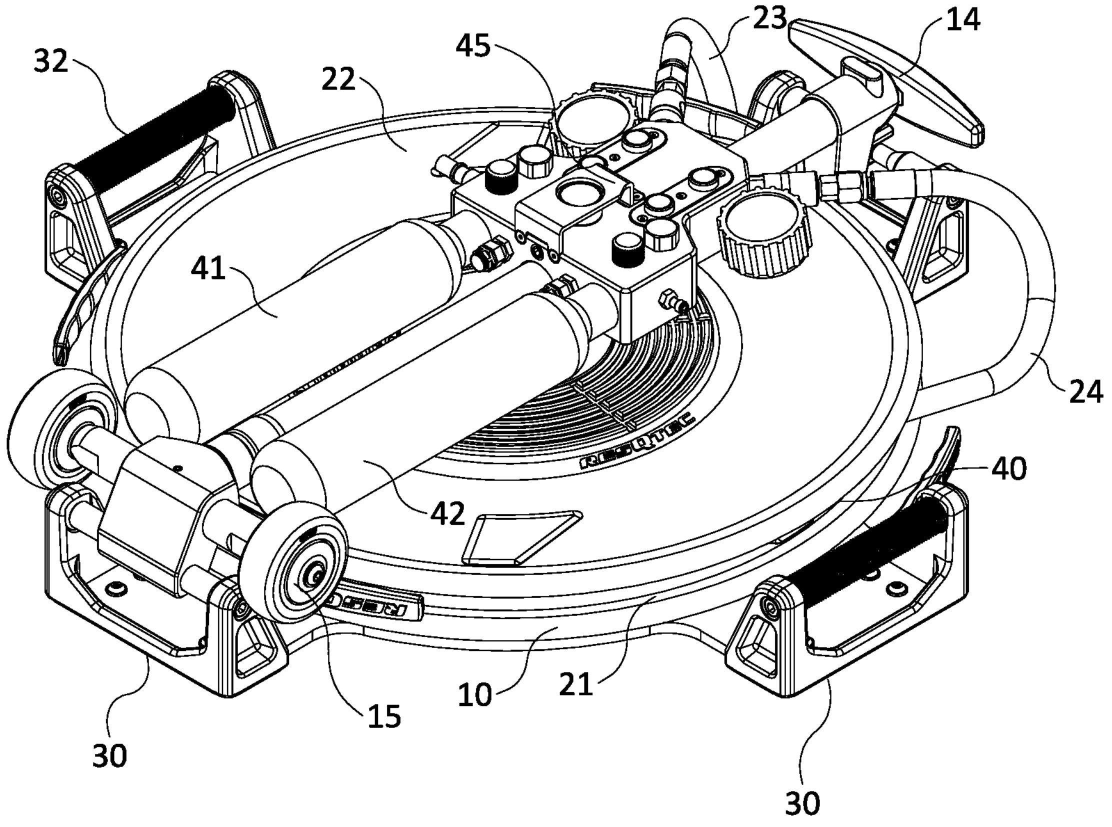
FIG. 7 shows a perspective view of a second exemplary embodiment of the lifting system according to the first aspect of the invention in a folded-up storage and/or transport state.
Figure 8:
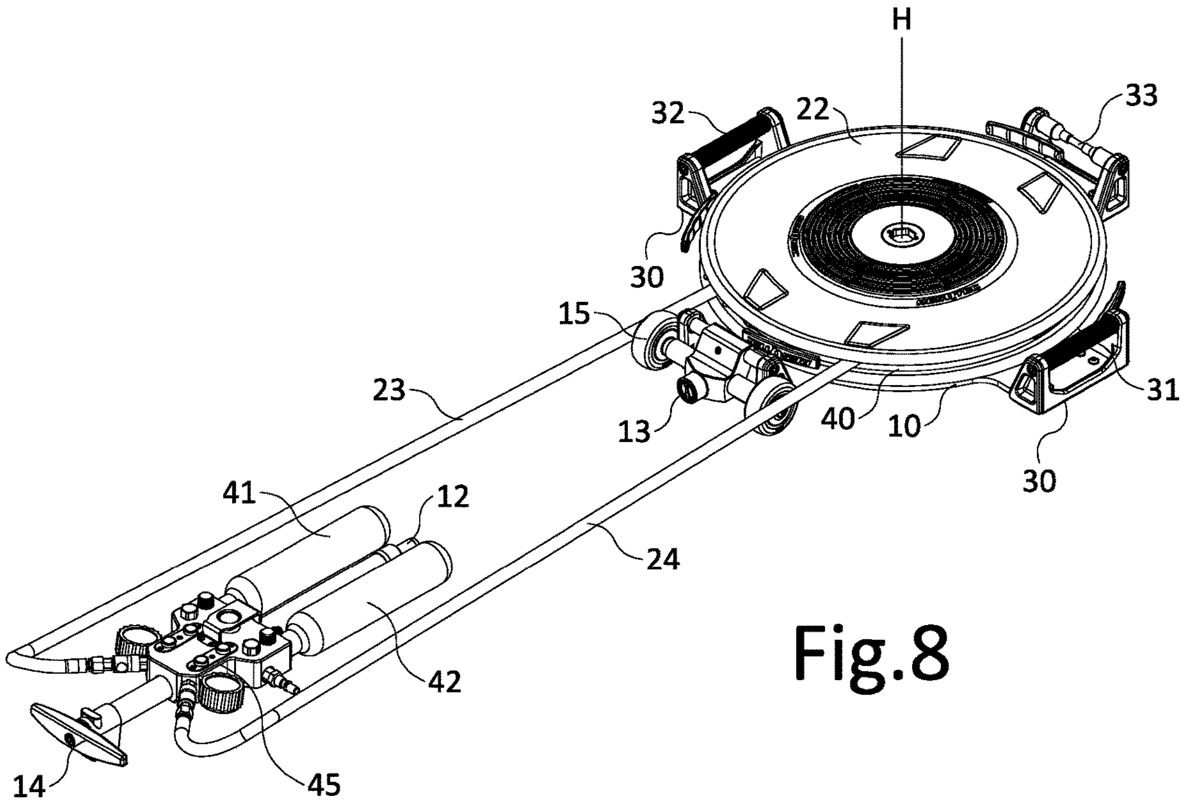
FIG. 8 shows a perspective view of the lifting system of FIG. 7 in a ready-to-use state.

FIGS. 7 and 8 show a lifting system according to a second exemplary embodiment of the invention in respectively a folded-up storage and/or transport state and an unfolded ready-to-use state. The device is largely the same as that of the first example, and corresponding parts are therefore designated with the same reference numerals. However, not only were the air hoses 23, 24 connected to cushions 21, 22 beforehand and do they lie rolled up in winding space 40 in the device shown here, a whole inflation system is otherwise also accommodated in the device. The inflation system comprises, among other things, two compressed air cylinders 41, 42 and an operating unit 45, with a control device with pressure reducing valve, which are mounted on the releasable shaft 12. The two air hoses 23, 24 are connected to the inlets of air cushions 21, 22 at their distal outer end, while their proximal outer ends were here already coupled beforehand to the operating unit with reducing valve 45.

Once the system has been slid underneath the object in the above stated manner, the shaft is uncoupled and removed. Because the proximal outer ends of air hoses 23, 24 are now connected fixedly to the control device with reducing valve 45 mounted on the shaft, hoses 23, 24 are here unrolled simultaneously, see FIG. 8. Once at a distance from the object to be lifted with platform 10 with cushions 21, 22 thereunder, the system is now immediately ready to be deployed into the state shown in FIG. 3. Loss of valuable time for mutually coupling the different components 21-24, 41, 42, 45 of the lifting system can be limited to a minimum in this way and thereby the chances of survival of any trapped victim significantly increased.

Figure 9:
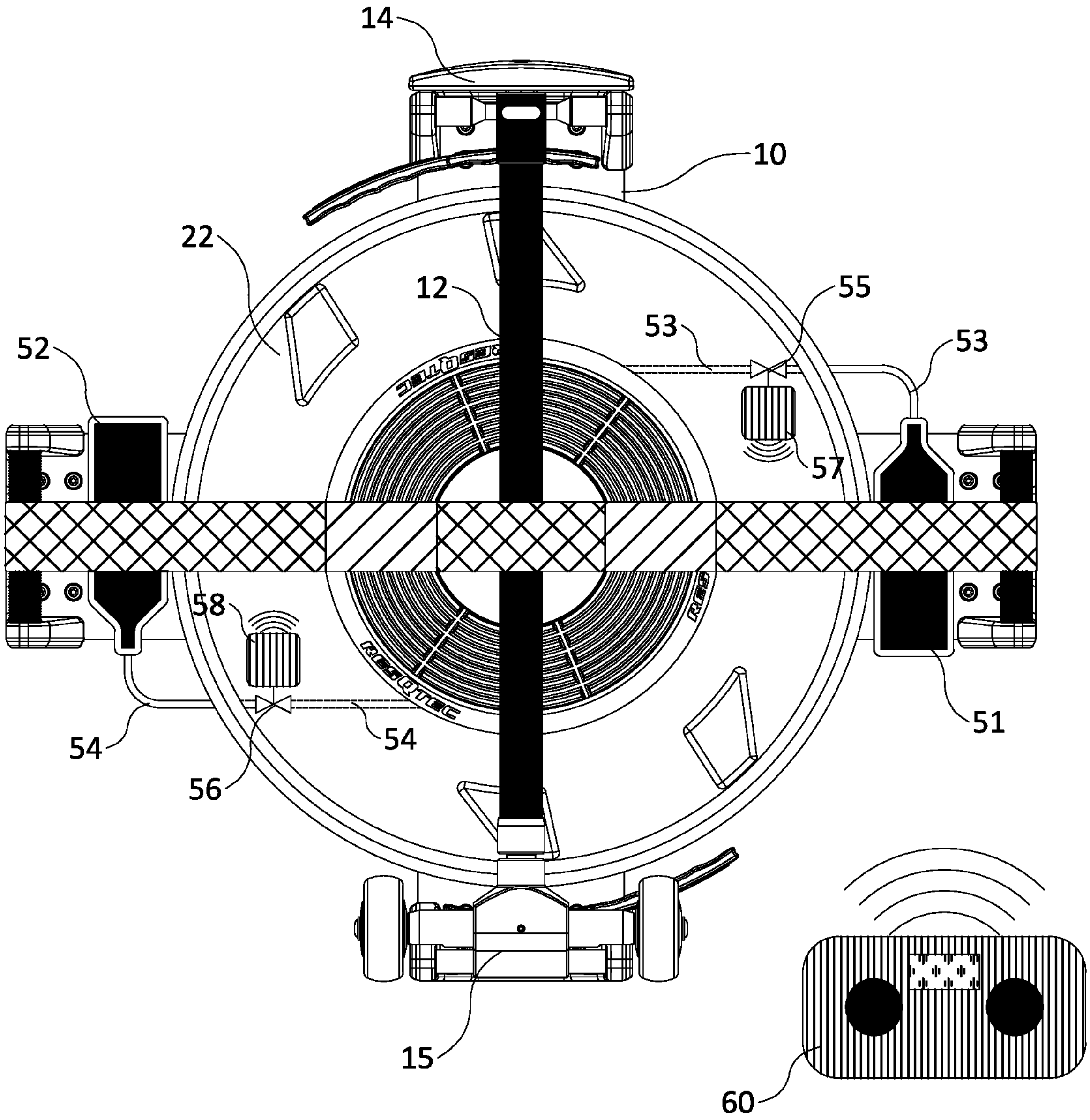
FIG. 9 shows a top view of an exemplary embodiment of the lifting system according to the second aspect of the invention in a folded-up storage and/or transport state.

An embodiment of a lifting system according to a second aspect of the invention is shown in FIG. 9. The construction of the lifting system is largely the same as that of the first example, albeit that a fluid system is in this case integrated fully on the platform and the two cushions 21, 22 need not be rotatable relative to the platform. Output conduits, such as the first example, which must be coupled to a remote compressed air system, are avoided here. Instead, the platform 10 accommodates a set of compressed air cylinders 51, 52 which are each connected to one of the cushions 21, 22 via an electronically controllable control valve 55, 56 or proportionally controllable pressure reducing valve and a short compressed air conduit 53, 54. Instead, it is otherwise optionally also possible to apply a single, shared compressed air cylinder. The control valve, or pressure reducing valve 55, 56, is controlled by a control device 57, 58 which is provided on or at platform 10 for this purpose and which is coupled wirelessly to an operating unit 60 for the user. Operating unit 60 enables the rescue worker to inflate and/or to deflate the two cushions 21, 22 individually or collectively, so that he/she is able to operate the system completely intuitively by giving each of the cushions more or less air independently of each other.

Although the invention has been further elucidated above with reference to only a single exemplary embodiment, it will be apparent that the invention is by no means limited thereto. On the contrary, many variations and embodiments are still possible within the scope of the invention for the person with ordinary skill in the art, as will be apparent from, among other things, a justifiably broad interpretation of the following claims.

The invention claimed is:

1. A lifting system, comprising a platform and at least one inflatable body, wherein the at least one inflatable body is connected to a fluid conduit for the purpose of receiving an inflating fluid, particularly a gas under increased pressure such as compressed air, wherein the at least one inflatable body is connected for rotation about a rotation axis to the platform, and wherein the at least one inflatable body bounds a winding space in which the fluid conduit, when not in use, is wound around the rotation axis.

2. The lifting system according to claim 1, wherein the at least one inflatable body comprises an inflatable cushion which is connected rigidly to a central shaft, and wherein the central shaft extends from the platform rotatably about a central axis of the at least one inflatable body.

3. The lifting system according to claim 1, wherein the at least one inflatable body comprises a stack of a first inflatable body and a second inflatable body, and wherein the first inflatable body and the second inflatable body bound the winding space therebetween and are both connected for rotation about the rotation axis to the platform.

4. A lifting system, comprising a platform with at least one inflatable body which is connected to a fluid conduit for the purpose of receiving an inflating fluid, particularly a gas under increased pressure such as compressed air, wherein the fluid conduit connects the inflatable body to a fluid reservoir via electronically controllable valve means, wherein the valve means are coupled to an electronic control device and are controllable thereby, wherein an operating device is coupled to the control device in order to enable a user to operate the control device, and wherein the operating device is coupled wirelessly to the control device.

5. The lifting system according to claim 4, wherein at least one fluid reservoir, the valve means and the control device are connected optionally directly to the platform together with the at least one inflatable body.

6. The lifting system according to claim 4, wherein the valve means comprise at least one of an electronic proportionally controllable pressure reducing valve and an electronic control valve.

7. The lifting system according to claim 1, wherein the platform comprises a rolling and/or sliding platform.

8. The lifting system according to claim 1, wherein the platform is coupled to a shaft, wherein the shaft provides a handle at a proximal outer end, and wherein the shaft features a control device and/or operating device for a fluid reservoir as well as the fluid reservoir and that said fluid conduit is connected to the fluid reservoir.

9. The lifting system according to claim 8, wherein the shaft is coupled to the platform in manually releasable manner.

10. The lifting system according to claim 8, wherein the shaft is coupled to the platform for pivoting about a pivot axis and can be folded together with the platform with the at least one inflatable body.

* * * * *